United States Patent
Lan

(10) Patent No.: US 8,122,421 B2
(45) Date of Patent: Feb. 21, 2012

(54) SYSTEM, AND METHOD, AND COMPUTER READABLE MEDIUM FOR DESIGNING A SCALABLE CLUSTERED STORAGE INTEGRATED CIRCUIT FOR MULTI-MEDIA PROCESSING

(75) Inventor: Hsueh Ban Lan, Cupertino, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 754 days.

(21) Appl. No.: 12/191,926

(22) Filed: Aug. 14, 2008

(65) Prior Publication Data
US 2010/0042956 A1 Feb. 18, 2010

(51) Int. Cl.
G06F 17/50 (2006.01)
G06F 13/16 (2006.01)

(52) U.S. Cl. .......................................... 716/132; 710/305
(58) Field of Classification Search ................... 716/132; 710/305
See application file for complete search history.

(56) References Cited

U.S. PATENT DOCUMENTS

| 6,006,296 | A | 12/1999 | Gold et al. |
| 6,366,977 | B1 | 4/2002 | Mizoguchi |
| 6,393,466 | B1 | 5/2002 | Hickman et al. |
| 6,477,618 | B2 | 11/2002 | Chilton |
| 6,988,170 | B2 | 1/2006 | Barroso et al. |
| 6,996,504 | B2 | 2/2006 | Novotny et al. |
| 7,208,793 | B2 | 4/2007 | Bhattacharyya |
| 2005/0044304 | A1 | 2/2005 | James |
| 2007/0022087 | A1 | 1/2007 | Bahar et al. |
| 2007/0157008 | A1* | 7/2007 | Sodani et al. ................. 712/239 |
| 2007/0245063 | A1 | 10/2007 | Fujimoto et al. |
| 2007/0297397 | A1 | 12/2007 | Coteus et al. |
| 2008/0133883 | A1* | 6/2008 | Glew .............................. 712/32 |

OTHER PUBLICATIONS

International Search Report and Written Opinion issued in related PCT Patent Application PCT/US2009/053887, dated Mar. 29, 2010, 11 pages.

* cited by examiner

*Primary Examiner* — Vuthe Siek
(74) *Attorney, Agent, or Firm* — Lathrop & Gage LLP

(57) ABSTRACT

An integrated circuit includes a clustered memory storage subsystem. The integrated circuit utilizes a baseline design that supports a scalable number of memory clusters. The number of storage devices within an individual memory cluster may also be selected to adjust the memory capacity. A single baseline design of a clustered memory storage subsystem design is customized for a particular integrated circuit with the number of memory clusters and storage devices within memory clusters selected for the memory requirements of a particular application. The design and verification costs to fabricate different versions of the integrated circuit are thus reduced.

25 Claims, 7 Drawing Sheets

SYSTEM, AND METHOD, AND COMPUTER READABLE MEDIUM FOR DESIGNING A SCALABLE CLUSTERED STORAGE INTEGRATED CIRCUIT FOR MULTI-MEDIA PROCESSING

FIELD OF THE INVENTION

The present invention is generally related to the design of memory systems to perform multi-media processing. More particularly, the present invention is directed to an integrated circuit using a scalable clustered memory storage subsystem design to support multi-media processing.

BACKGROUND OF THE INVENTION

There is increasing interest in multi-media systems for consumer applications. In such consumer applications it is typically desirable to implement the multi-media system using a minimum number of chips. A multi-media system typically supports a variety of video processing and storage options. The video processing operations, in turn, require processing and memory resources to perform operations such as video decoding and data compression.

One problem faced in the industry is that the demands placed on multi-media systems continue to increase. In particular, as the industry moves to higher pixel-resolution formats the processing and memory resource requirements increase. As a result, chip designers face two fundamental choices. First, one option is to design a multi-generation chip that has sufficient excess processing and memory storage to support both current and future possible processing and memory resource needs for several applications in its life span. However, this approach results in the chip initially being more expensive than desired. Another option is to design a fundamentally new chip each time system requirements change or pixel resolution is increased. However, this option has the disadvantage of requiring substantial research and development costs.

Therefore, to address the above-described problems, a new memory storage architecture, system, and method was developed.

SUMMARY OF THE INVENTION

A clustered memory storage subsystem chip is designed to support multi-media applications. The clustered memory storage subsystem has an integrated circuit design that supports a scalable number of memory clusters to provide a first level of control over memory capacity. In one implementation the number of storage devices within individual memory clusters is also scalable to provide a fine level of control over memory capacity. The number of write and read ports is also scalable. A single baseline design may be used to support different implementations of the chip having different memory requirements.

One embodiment of a method of designing an integrated circuit to support multi-media processing includes providing a scalable clustered memory storage subsystem baseline design including a scalable number of memory clusters coupled by a hub to support inter-cluster memory access traffic among memory clusters in the group of memory clusters and traffic with an external interface which connects to a host interface. The method includes selecting the number of memory clusters in the clustered memory storage subsystem to be a minimum number to support multi-media processing at a desired maximum supported pixel resolution. The number of storage devices within individual memory clusters is selected to minimize the number of storage devices required to support the desired maximum supported pixel resolution. The selection of the number of memory clusters and the number of individual storage devices within memory clusters characterize the baseline design of this scalable clustered memory subsystem to minimize chip real-estate required to support the memory requirements of an individual multi-media chip design.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
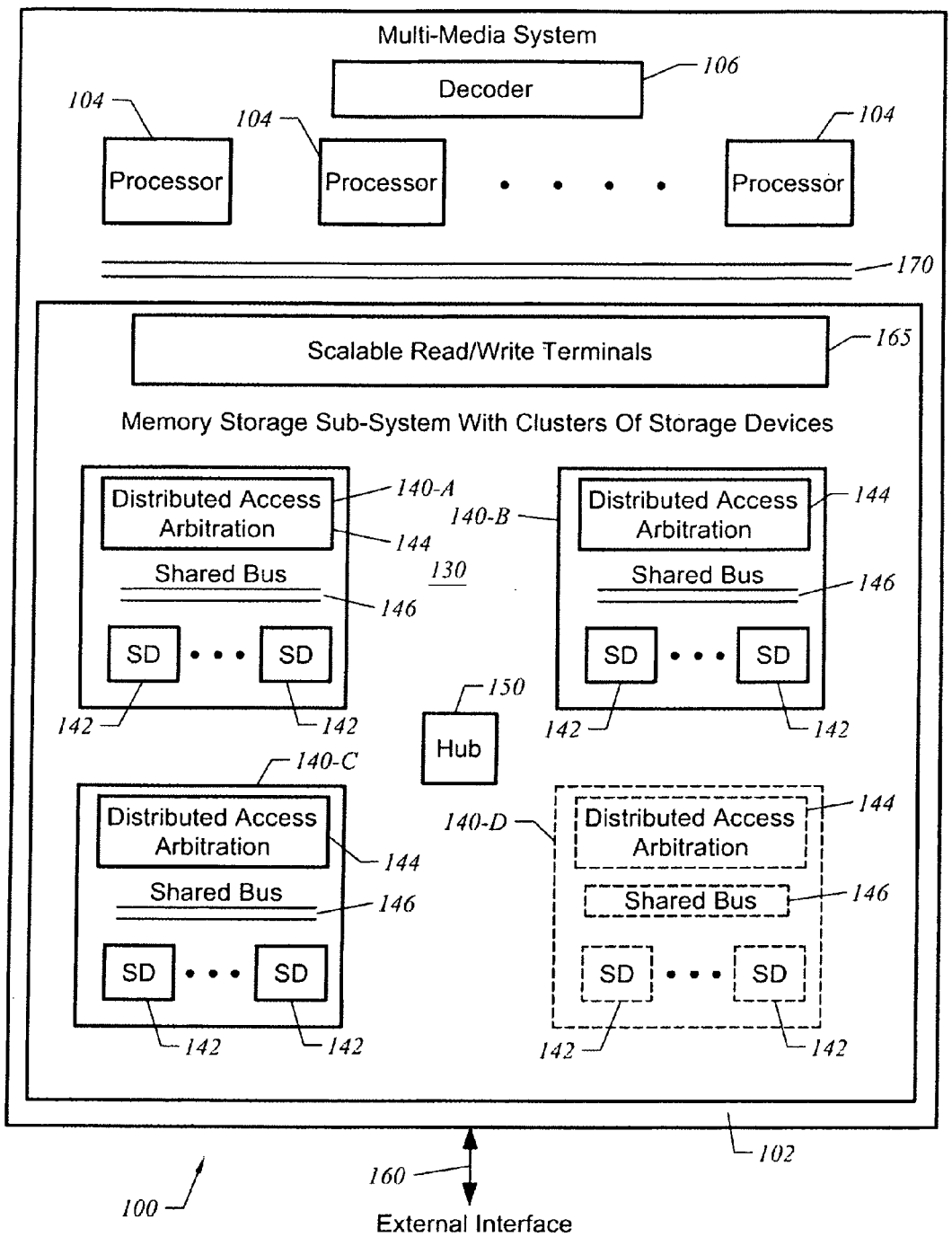
FIG. 1 illustrates an exemplary multimedia decoding system having a clustered memory storage subsystem in accordance with one embodiment of the present invention.

FIG. 1 illustrates an exemplary multimedia decoding system 100 having a clustered memory storage subsystem 130 formed on a single chip 102 with a scalable design architecture in accordance with one embodiment of the present invention. The multimedia decoding system 100 includes a set of processing units 104 to perform multimedia computational functionalities. A decoder 106 is provided to support decoding operations. The processing units 104 are coupled to the clustered memory storage subsystem 130 by a high bandwidth internal bus 170. The bandwidth and latency of high bandwidth internal bus 170 is selected to be sufficiently high to permit processing units 104 to achieve a desired frame rate in a parallel fashion.

In one embodiment the processing units 104, decoder 106, and high bandwidth internal bus 170 are fabricated on single chip 102. Alternatively, processing units 104 and decoder 106 may be fabricated on a separate chip (not shown) and then packaged together with the chip 102 that includes clustered memory storage subsystem 130.

The clustered memory storage subsystem 130 is an integrated circuit fabricated on single chip 102 and correspondingly the cost of single chip 102 will depend on how much chip real estate is devoted to memory. A scalable baseline design of clustered memory storage subsystem 130 includes a set of memory clusters 140. In the scalable baseline design there is a supported range of memory clusters 140 from some minimum number (e.g., one) up to a maximum number of memory clusters 140. That is, prior to chip fabrication the number of memory clusters 140 is selectable within a supported range. For the purposes of illustration, a scalable baseline design having a maximum of four memory clusters 140-A, 140-B, 140-C, and 140-D is illustrated although it will be understood that different numbers are contemplated.

Each individual memory cluster 140 includes a set of memory storage devices 142, distributed access arbitration logic 146, and a shared read/write access intra-cluster bus 144. An individual storage device 142 may, for example, be implemented as a bank of Static Random Access Memory (SRAM). The distributed access arbitration logic 146 and shared read/write access intra-cluster bus 144 supports a default (maximum) number of storage devices 142. In one embodiment the distributed access arbitration logic 146 and shared read/write access intra-cluster bus 144 supports a range in the number of memory storage devices 142. That is, prior to chip fabrication the number of memory storage devices 142 can be adjusted from the scalable baseline design within a specified range.

A memory hub 150 supports inter-cluster memory traffic as well as traffic with an external host interface 160. In a scalable baseline design, memory hub 150 is designed to support different numbers of memory clusters within a pre-selected range.

The scalable baseline design of clustered memory storage subsystem 130 includes a set of read/write terminals 165 to couple the processing units 104 to respective read/write ports (not shown in FIG. 1) of memory clusters 140. The read/write terminals are preferably scalable in that the number of read and write terminals are preferably individually selectable over a specified range to support changes in the numbers of memory clusters 140. Additionally, in one embodiment the number of read and write terminals are individually selectable to support unbalanced (asymmetric) read/write traffic.

The scalable baseline design of clustered memory storage subsystem 130 is scalable in that a single integrated circuit design architecture can be customized prior to chip fabrication to adjust the total memory size of the chip. The memory storage capacity of the scalable baseline design of clustered memory storage subsystem 130 can be selected at a coarse level by selecting the number of memory clusters 140 having the default number of storage devices 142 to be a minimum number based on the required memory capacity. Additionally, in one embodiment the memory storage capacity of clustered memory storage subsystem 130 can be tuned at a finer level by adjusting the number of storage devices 142 within an individual memory cluster 140 to a number less than the default value. After the memory capacity of the scalable baseline design is adjusted the chip design is completed and the final chip fabricated.

This design approach reduces the design and verification costs to fabricate two or more different versions of a chip. Design costs are reduced by virtue of the use of a common scalable baseline design. Embodiments of the present invention also reduce chip design verification costs. Chip design verification includes verification of specific hardware implementations to confirm that an implementation of a high level design meets specifications at a block and system level. Design verification can, for example, include checking different implementations of the chip to discover and eliminate bugs and defects. Chip design verification can consume a large percentage of project resources in a conventional chip development product cycle. There are estimates that up to 70% of a chip project development cycle for an Application Specific Integrated Circuit (ASIC) is devoted to design verification (see, e.g., the online article by Alain Raynaud, "The New Gate Count: What is Verification's Real Cost," Electronic Design Online, Oct. 27, 2003, Electronic Design Online ID #5954, available at http://electronicdesign.com/Articles/Index.cfm?AD=1&ArticleID=5954). However, in accordance with the present invention verification costs are reduced in several ways. First, the development of an initial version of the chip will include design verification to confirm that a particular implementation of individual block elements in the initial design (such as a memory cluster 140) meet specifications. Additionally, during the development of an initial version of the chip the design verification will confirm that an implementation of the chip functions together properly at a system level (i.e., the individual block elements work together properly at a logical level and a signal level). Consequently, after design verification of the initial chip design, at least one implementation of individual block elements are, by necessity, debugged along with the interactions between block elements. Subsequent chip versions (e.g., with different numbers of memory clusters and/or memory storage units) can leverage off of the verification data acquired for the initial chip release. That is, subsequent chip version can use the same (or similar) proven implementations of block elements, signal buses, or other elements, thereby greatly reducing the design verification costs and development time in subsequent chip versions.

As an illustrative example, a scalable baseline design may support an adjustable number of memory clusters up to four memory clusters 140-A, 140-B, 140-C, and 140-D. However, the baseline design is scalable in that the number of memory clusters 140 fabricated into a chip can be any number up to the maximum number of supported memory clusters. In this illustrative example, the same integrated circuit design architecture can thus support four different chip implementations, namely a first version of the chip fabricated with one memory cluster (e.g., cluster 140-A), a second version of the chip fabricated with two memory clusters (e.g., clusters 140-A and 140-B), a third version of the chip fabricated with three memory clusters (140-A, 140-B, and 140-C), and a fourth version of the chip fabricated with four memory clusters (140-A, 140-B, 140-C, and 140-D). In the example of FIG. 1 one of the memory clusters (140-D) is illustrated in phantom (i.e., with dashed lines) to indicate that the fabricated chip has one fewer memory cluster than the maximum number supported by the scalable baseline design.

Reducing the number of memory clusters 140 to a minimum required for a particular multi-media system application reduces chip cost. That is, it is desirable to minimize chip real estate devoted to memory to reduce chip cost. However, the use of a common design architecture for different chip runs has the advantage that it reduces development and verification costs.

In one embodiment the memory storage capacity of clustered memory storage subsystem 130 is based on a supported pixel resolution of multimedia decoding system 100. An exemplary multimedia decoding system 100 supports video processing operations that can be processed in parallel using an array of processing units 104. As one example, some types of video decoding and decompression operations can be performed on an image using parallel processing techniques that work on different portions of an image simultaneously. Generally speaking, the processing and memory resources to perform parallel processing of images at a selected frame rate will tend to increase with increasing pixel resolution. For example, to perform video processing on three megapixel images will require less processing power, less memory bandwidth, and a smaller amount of memory capacity than five megapixel images. Consequently, the minimum number of processing units 104 will depend on the maximum supported pixel resolution. Similarly, the required memory capacity of clustered memory storage subsystem 130 will also depend on the maximum supported pixel resolution.

Figure 2:
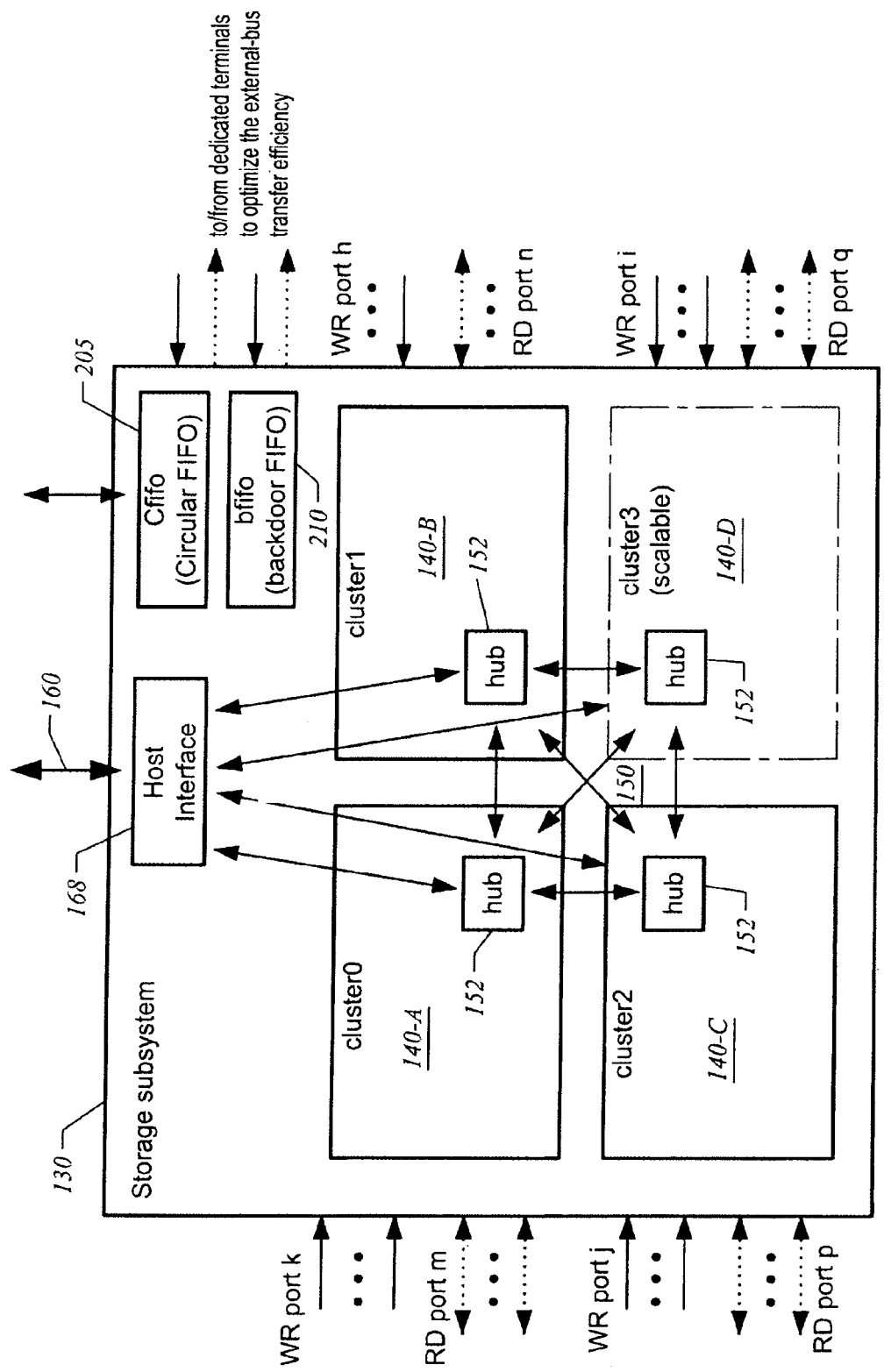
FIG. 2 illustrates an exemplary clustered memory storage subsystem architecture in accordance with one embodiment of the present invention.

For a particular chip release, the design of clustered memory storage subsystem 130 may be adjusted to have a minimum memory capacity required to support the multi-media system at a desired maximum supported pixel resolution. Thus for a particular chip version, a determination would be made of the memory capacity required to support the number of processing units 104 required for a particular supported pixel resolution. The total memory capacity of the clustered memory storage subsystem 130 would then be scaled to support the required memory capacity by adjusting the number of memory clusters 140 to be a minimum number sufficient for the supported pixel resolution. In some cases an integer (positive) number of memory clusters 140 having the default number of storage devices 142 would exactly satisfy the memory requirements. However, in some cases additional adjustment can be performed at a fine level by adjusting the number of storage devices 142 in each memory cluster 140 to fine tune the memory capacity and throughput. For example, the number of storage devices 142 may be adjusted within one of the memory clusters to fine tune memory capacity towards a minimum memory capacity required for the supported pixel resolution. However, more generally the fine tuning could also be accomplished by adjusting the number of storage devices 142 in more than one memory cluster 140. Additionally, the number of read ports and the number of write ports associated with read/write terminals 165 may be selected based on anticipated read/write traffic patterns to fulfill various system requirements, FIG. 2 illustrates in more detail a high level view of the traffic within an exemplary clustered memory storage subsystem 130 supporting a maximum of four memory clusters 140-A, 140-B, 140-C, and 140-D with certain features omitted for clarity. Each memory cluster 140 has a respective set of read and write ports. The number of read ports (RD ports) and write ports (WR ports) associated with each individual memory cluster 140 does not have to be identical. In particular, in certain types of video processing the memory traffic is not balanced. For example, for encoding operations there are more read operations than write operations so the number of read ports can be selected to be greater than the number of write ports. This is because for encoding operations, the encoding algorithm tends to compress input data into a more compact format. Conversely, for video decoding operations there are more writes than reads and the number of write ports can be selected to be greater than the number of read ports. Thus, in FIG. 2 memory cluster 140-A (cluster 0) has a total number k of write ports and a total number m of read ports; memory cluster 140-B (cluster 1) has a total number h of write ports and a total number n of read ports; memory cluster 140-C (cluster 2) has a total number j of write ports and a total number p of read ports; and memory cluster 140-D (cluster 3) has a total number i of write ports and a total number q of read ports.

The hub 150 may be implemented using hub interfaces 152 in each memory cluster 140. Point-to-point communication buses (as indicated by the internal arrows) may be used to couple each memory cluster 140 to the other memory clusters and to the external interface 160 to support inter-cluster traffic and traffic to a host interface support module 168. For example, inter-cluster traffic may be supported via point-to-point communication buses implemented through hub-to-hub wiring between hub interfaces 152. In one implementation a circular FIFO (CFIFO) 205 and a backdoor FIFO (BFIFO) 210 are coupled to dedicated terminals and provided to optimize the external host bus transfer efficiency. For example, the CFIFO 205 and BFIFO 210 may be provided to deal with bursty I/O traffic respectively.

The strong locality characteristics of multi-media data facilitates designing the hub 150 and other components of a scalable baseline design of clustered memory storage subsystem 130 to support a scalable number of memory clusters 150. Tire multi-media data processing has strong locality characteristics in the data. In particular, video processing operations organized as parallel processing operations tend to have a high degree of spatial and temporal locality as it is possible to assign different localized regions of the image to different processors. For example, certain types of video encoding and decoding operations are performed on an image by dividing the image into blocks and performing processing operations at a block or sub/block level; the block may, for example, be 8-by-8 pixel or 16-by-16 pixel blocks. The processing work can be assigned in a parallel fashion by individual processing units 104 about localized regions such that processing tasks for localized regions have read/write operations highly correlated to specific individual memory clusters 140. One consequence is that the inter-cluster traffic requirement is lower than the intra-cluster traffic requirement such that a common design of hub 150 supports a variable number of memory clusters 140. Another consequence is that the number of required memory clusters 140 will tend to scale with the supported pixel resolution. Additionally, the locality characteristics facilitate designing an individual memory cluster 140 to have a scalable number of storage devices 142.

Figure 3:
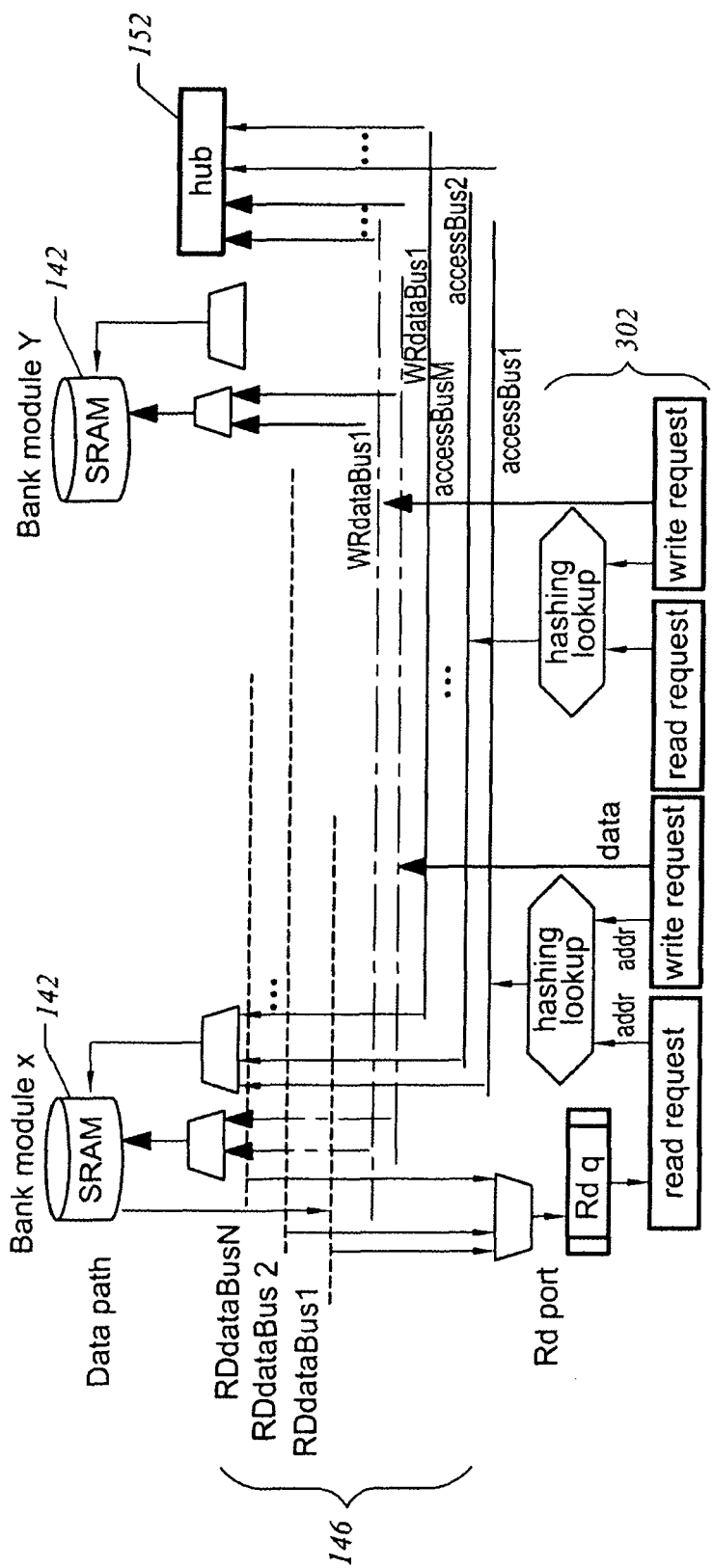
FIG. 3 illustrates an exemplary individual memory cluster in accordance with one embodiment of the present invention.

FIG. 3 illustrates an exemplary architecture of an individual memory cluster 140 having a shared read/write access bus 146 with the distributed access arbitration logic 144 omitted for clarity. The architecture includes a plurality of storage devices 142 implemented as SRAM banks each coupled to the shared read/write/access buses 146. Each individual storage device SRAM bank module 142 may, for example, be implemented as a 4 KB to 32 KB SRAM storage device. There are a total number N of read data buses (RDdaiaBus1 to RDdataBusN) and a total number M of write data buses (WRdataBus1 to WRdataBusM). That is, there is an extensible number of read and write terminals within a supported range. In one implementation up to eight SRAM banks (eight storage devices 142), up to six read ports, and up to four write ports are supported. A set of M access buses (accessBus 1 to accessBus M) are provided to control access for memory reads and writes. For the purposes of illustration two exemplary storage devices 142 are illustrated in detail. Lookup logic 302 is provided and may include read queues (Rdq) to perform any necessary reordering of long latency hub read back transaction and hashing lookup tables to translate read and write addresses to avoid conflicts. An exemplary access bus format includes a request, a read/write command, a SRAM index, a SRAM bank, a hub ID number and a queue entry tag. Inter-cluster traffic (hub read and write traffic through the hubs) may be treated as a read/write port to a storage device 142 (from a read/write access's perspective).

Figure 4:
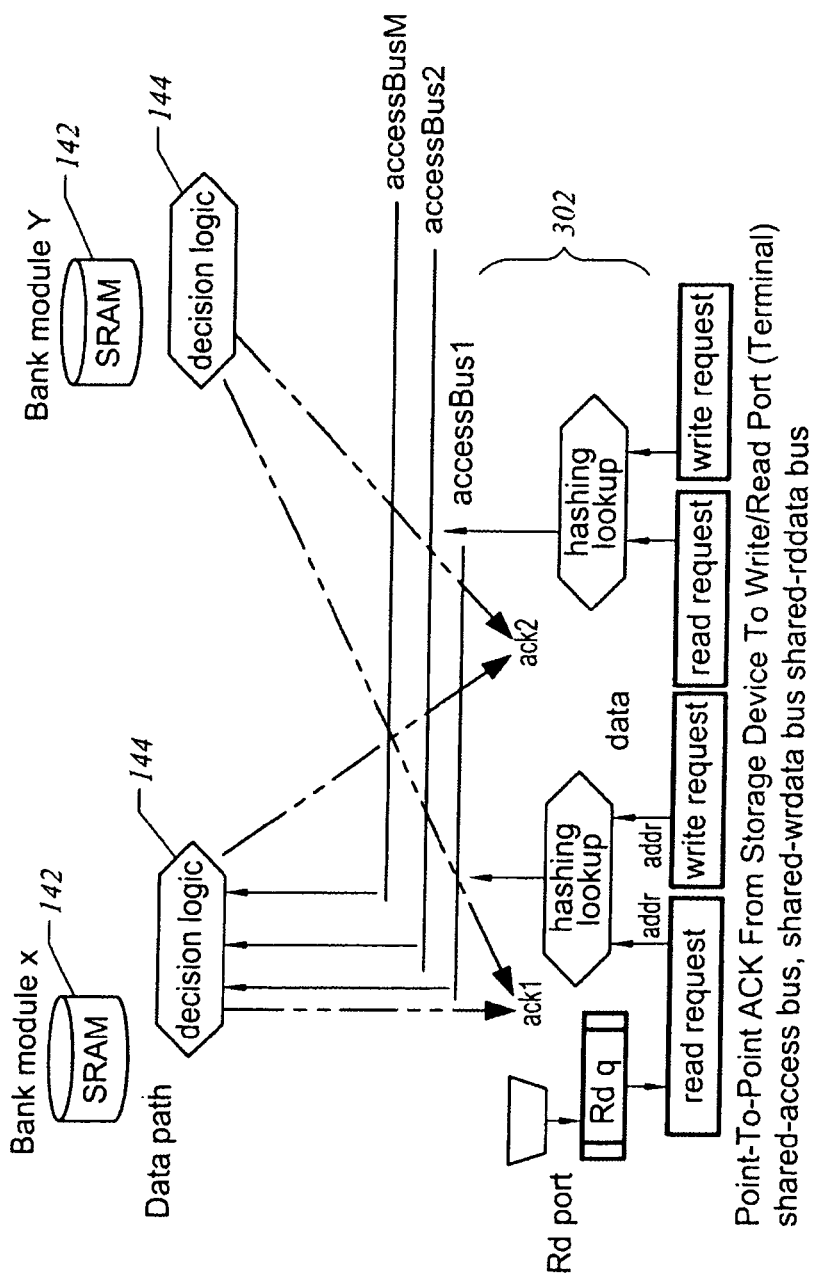
FIG. 4 illustrates arbitration decision logic within each memory cluster in accordance with one embodiment of the present invention.

FIG. 4 illustrates aspects of an embodiment of distributed access arbitration decision logic 144 within one memory cluster 140. In this embodiment, the distributed access arbitration decision logic 144 comprises logic associated with each storage device 142 to decide which read/write terminals can access each storage device 142 for each clock cycle. The distributed access arbitration decision logic 144 makes arbitration decisions based on the status of the access buses (accessBus1 to accesBusM) and issues an acknowledgement (Back) for one of the service requests. The service acknowledge signal (Back) is implemented in a point-to-point manner, which improves the response between storage devices and terminals within one memory cluster. It will be understood that an advantage of distributed access arbitration decision logic 144 is that it supports a scalable number of storage devices 142. That is, it supports access arbitration even if the number of storage devices is varied to achieve fine tuning of memory capacity within an individual memory cluster.

Figure 5:
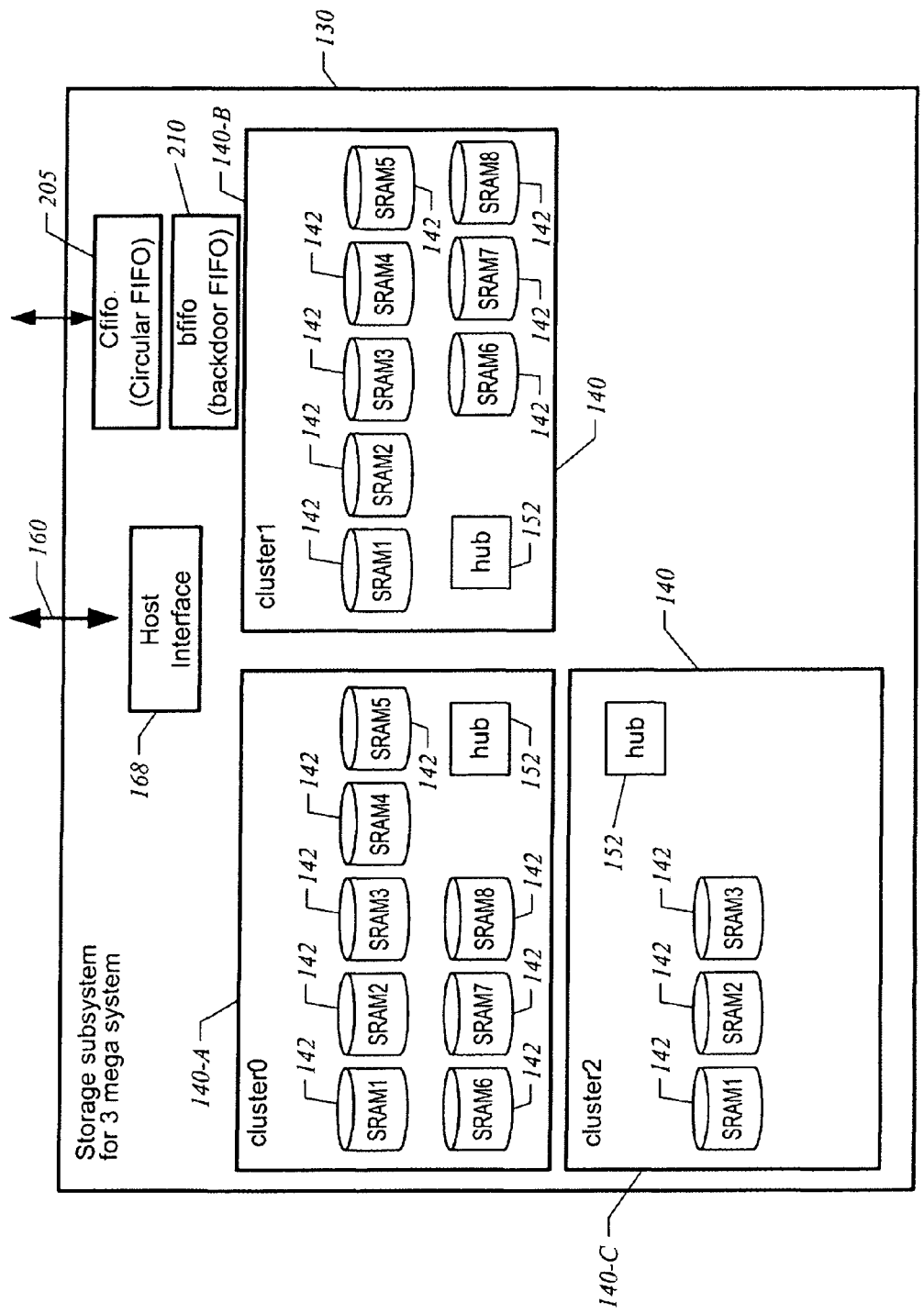
FIGS. 5-6 illustrate two examples of memory storage subsystems using a common scalable architecture but with different selections of the number of clusters and storage devices in accordance with embodiments of the present invention.
Figure 6:
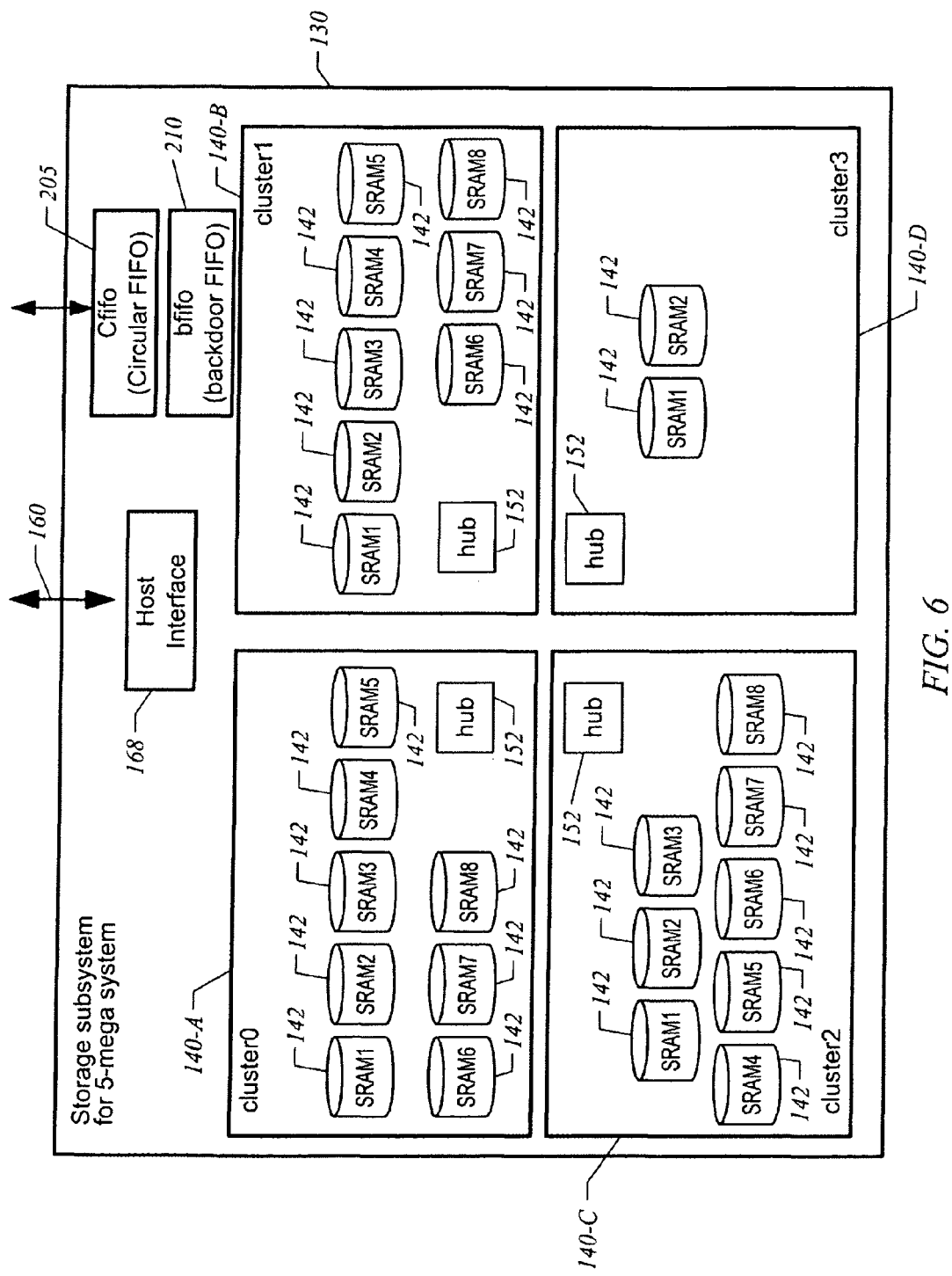

Some of the advantages of the present invention are illustrated in the examples of FIGS. 5-6. Assume in these examples that a scalable baseline design of clustered memory storage subsystem 130 supports up to four memory clusters 140 and that the default (maximum) number of storage devices 142 in each cluster is eight. In this example the hub 150 has hub interfaces 152 designed to be capable of supporting inter-cluster traffic for up to four clusters and the intra-cluster buses are designed to support up to eight storage devices. However, the number of clusters and the number of storage devices within each cluster can be customized for a particular chip release. Referring to FIG. 5, consider first that the design of the clustered memory storage subsystem is customized to support a multimedia system, design at a three mega-pixel resolution. In the example of FIG. 5, the read/write access bandwidth and memory capacity that is entailed corresponds to nineteen storage devices (SRAM banks) each having 4 KB of storage. The nineteen storage devices are implemented using three clusters. Two of the clusters 140-A (cluster 0) and 140-B (cluster 1) have a full set of eight storage devices 142. One of the clusters 140-C (cluster 2) has a reduced capacity with three storage devices. Thus, the example of FIG. 5 illustrates scalability at both a coarse memory cluster level and at a fine level within individual memory clusters. Consider now the example of FIG. 6 in which the same scalable baseline design is use to support five mega-pixel applications. The memory requirements scale up proportionately to twenty-six storage devices. Consequently, four memory clusters 140-A, 140-B, 140-C, and 140-D are fabricated into the chip. Three of the clusters 140-A, 140-B, and 140-C have a full set of eight storage devices 142. One of the clusters 140-D has two storage devices 142, As can be understood from the examples of FIGS. 5-6, the present invention can be used in several different ways. One application of the present invention is to provide a scalable baseline design to support simultaneously manufacturing different versions of a chip to support different pixel resolutions. Another application of the present invention is to provide a scalable baseline design to manufacture a current generation of a chip while also supporting anticipated future chip generations. As one example, a product roadmap may include an initial chip release and a planned next generation chip with enhanced performance as part of a product roadmap. In either case, design and verification costs to produce two or more different versions of a chip are reduced through reuse of a scalable architecture design. As still yet another example, the scalable baseline design also permits a product roadmap in which an initial product is followed some time later by a cheaper, lower performance chip.

Figure 7:
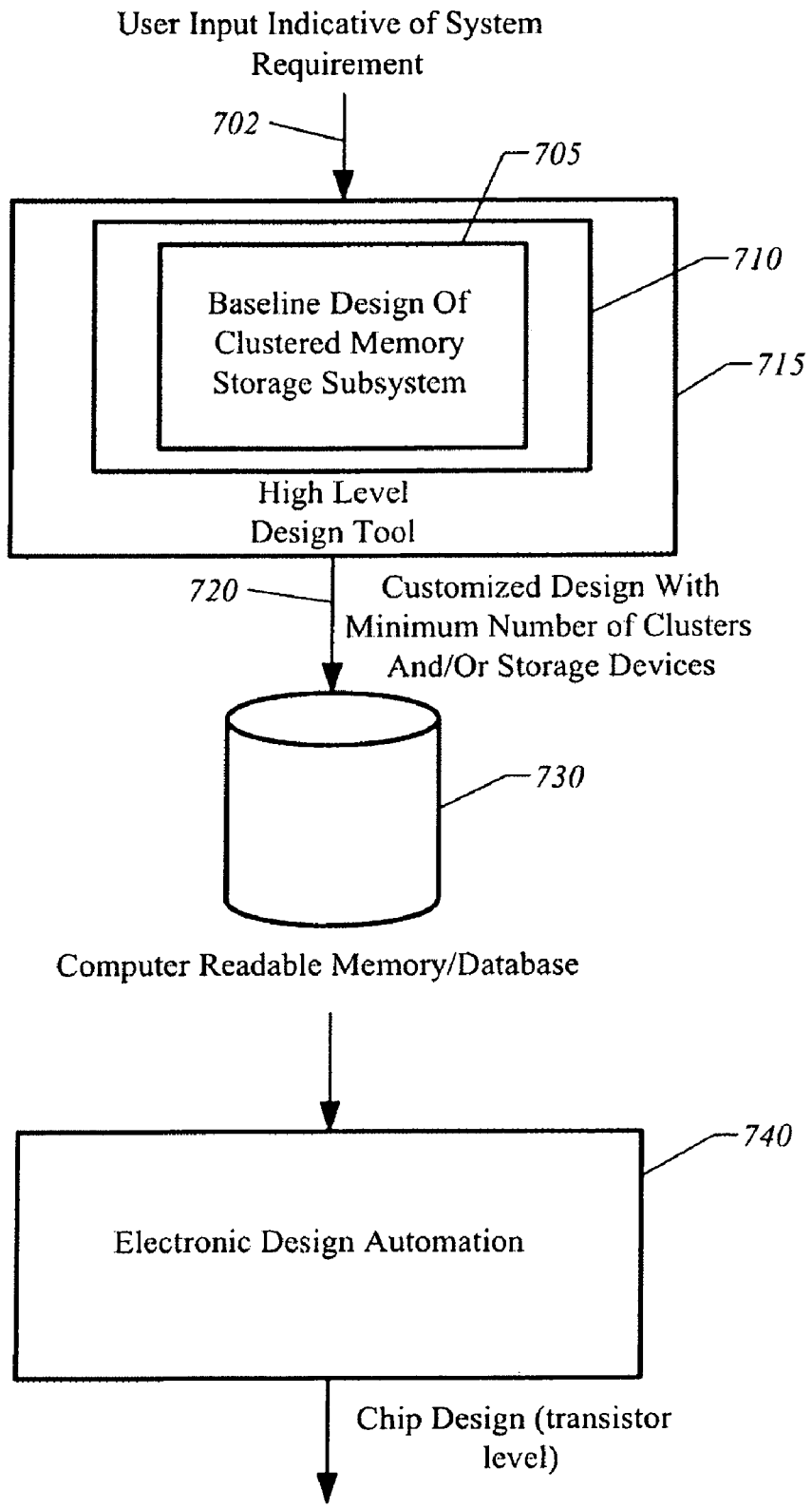
FIG. 7 illustrates the use of the baseline design of the clustered memory storage subsystem within computer aided design tools in accordance with one embodiment of the present invention.

Referring to FIG. 7, in one embodiment a scalable baseline design 705 of the clustered memory storage subsystem 130 is stored in a memory 710 of a computer aided design tool 715. A user inputs a system requirement, such as a pixel resolution, which generates command 702 to scale the memory capacity. In response to the received command, computer aided design tool 715 generates a customized design 720 having a minimum number of memory clusters and/or a minimum number of storage devices that will be fabricated in the chip. In one embodiment a user directly inputs selections regarding the number of memory clusters and number of storage devices. Alternatively, the computer aided design tool 715 may have the scalable baseline design automated to permit a user to input a desired pixel resolution or memory capacity and the computer aided design tool 715 then automatically adjusts the number of memory clusters and storage devices to minimize chip real estate devoted to memory. The customized high-level chip design 720 for a particular chip release would then be stored in a memory 730, such as a computer memory, computer database, or portable storage medium.

Access to a version of the customized high level chip design 720 stored in a database memory 730 would then be provided to an electronic design automation (EDA) tool 740 to design a customized chip at a transistor level. For example, the high level chip design 720 could be provided to an EDA tool 740 using any conventional data transfer techniques, such as providing access through a network or by providing a copy of the high level chip design 720 on a computer readable medium. While one implementation is to have a separate high, level design tool 715 and transistor level EDA tool 740, it would be understood that both functions could be implemented in one common design tool, if desired.

It will also be understood that the hardware-based implementation may be selected using verification data from an earlier chip version that is stored in a computer storage medium accessible by transistor-level EDA tool 740. After an initial chip design (based on the scalable baseline design) passes verification there will be at least one proven implementation of block level components, such as individual memory clusters. Other components will also be verified, such as the design of buses and interfaces. That is, after the initial chip is verified various aspects of the chip design at a logical level and a signal level will also be verified, such as implementation details related to bus designs, interfaces, and point-to-point connections used in the hub.

These implementation specific details can be stored for use in designing subsequent chips based on the scalable baseline design. For example, instead of utilizing an arbitrary hardware implementation of individual block elements (such as an implementation of an individual memory cluster), the transistor level EDA tool 740 may be programmed to use, as a starting point, hardware implementations of individual block elements based on any hardware implementations verified for the earlier chip design. In particular, once a hardware implementation of a memory cluster is perfected in an initial chip based on the baseline design, a subsequent chip (that is also based on the baseline design) is likely to be able to use an identical or extremely similar hardware implementation of the memory clusters. Thus in the examples of FIGS. 5-6, large variations in memory capacity in different chips is achievable using identical or very similar implementations of the memory clusters.

Similarly, many aspects of the implementation of the buses and interfaces may use, as a starting point, implementations verified for the earlier chip design. The high level design has a bus architecture is scalable (over a selected range). One of ordinary skill in the art would understand that the scalable nature of the signaling in the scalable baseline design makes it unlikely that a change in the number of memory clusters and memory storage devices (within the design range) will, by itself, generate signaling bugs. Thus it is highly likely once a hardware implementation is proven to work in a first chip (with a first number of memory clusters and a first number of storage devices) that an identical or similar implementation approach will also work in a second chip (with a second number of memory clusters and a second number of storage devices). Consequently, the development time and cost for a subsequent chip is greatly reduced using the design approach of the present invention.

Additionally, the strong locality of media data, which results in intra-cluster traffic being greater than inter-cluster traffic, also makes it unlikely that modest changes in the number of memory clusters (within the design range) will generate bugs in hub traffic. That is, a proven implementation of a hub design developed for an initial chip design is likely to be a useful starting point in terms of generating an implementation of a hub in another chip with somewhat different numbers of memory clusters.

The present invention provides several benefits over the prior art. Prior art clustered storage systems are typically implemented at a server level using different stand-alone units. That is, scalability at a server level is achieved by replicating entire stand-alone memory units, where each memory unit has a set of chips. As a result, in a conventional server level clustered memory design, multiple chips are used in parallel to scale the memory capacity. In a conventional clustered memory storage system, additional units (and hence additional chips) are added to scale up memory capacity. However, a conventional server-level clustered storage system cannot be directly implemented in a single chip while retaining the cost reduction benefits of scalability. The present invention permits a scalable clustered storage subsystem to be implemented at an integrated circuit level. Since a scalable baseline integrated circuit design is scalable over a range in the number of memory clusters, storage devices per cluster, and read/write ports, the design can be scaled in different chip versions to reduce design time and/or costs for a new chip. In particular, a change in the number of memory clusters fabricated into a chip may be used to achieve a significant change in memory capacity and system performance. Additionally, the present invention permits verification time and/or costs to be reduced for a new chip by virtue of using a scalable baseline design and by virtue of the capability to leverage off of verification data acquired for a hardware implementation of a previous version of the chip.

An embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. An integrated circuit to support multi-media processing of image data, comprising: a scalable clustered memory storage subsystem including:
   a set of memory clusters and a common hub coupled to each memory cluster, the common hub supporting inter-cluster memory traffic between individual memory clusters in the set of memory clusters and traffic with an external interface;
   each individual memory cluster having a number of storage devices;
   read ports and write ports; and
   a high bandwidth interface to couple the read and write ports to at least one processing unit.

2. The integrated circuit of claim 1, wherein the scalable clustered memory storage subsystem is scalable at a fine level of granularity by selecting the number of storage devices within an individual memory cluster that are fabricated into the integrated circuit.

3. The integrated circuit of claim 2, wherein each individual memory cluster comprises an intra-cluster bus and access arbitration logic to control access to the number of storage devices to support a range in the number of storage devices.

4. The integrated circuit of claim 3, wherein each intra-cluster bus includes a number of individual read and write buses coupled to respective read and write ports of the high bandwidth internal bus, and wherein the number of individual read buses and individual write buses is independently scalable within a supported range to support a scalable number of read ports and a scalable number of write ports.

5. The integrated circuit of claim 4, wherein the number of read ports and the number of write ports is separately selected prior to integrated circuit fabrication to support unbalanced read/write traffic.

6. The integrated circuit of claim 1, wherein the at least one processing unit comprises a number of processing units for parallel multi-media processing, said multi-media processing comprising image processing operations having a high degree of locality such that inter-cluster memory traffic is less than intra-cluster memory traffic.

7. The integrated circuit of claim 1, wherein the at least one processing unit comprises a number of processing units for parallel multi-media processing, said multi-media processing comprising image processing and the number of processing units and the amount of memory required to support the processing units scales with image pixel resolution, said scalable clustered memory storage subsystem having the number of memory clusters selected based on memory requirements to perform multi-media processing for a supported image pixel resolution.

8. The integrated circuit of claim 1, wherein the scalable clustered memory storage subsystem is capable of supporting a range of memory clusters up to a maximum number of memory clusters with a memory capacity chosen prior to fabrication by selecting the number of memory clusters in the set of memory clusters that are fabricated into the integrated circuit.

9. A computer implemented method of designing an integrated circuit to support multi-media processing using a computer-aided design tool, comprising:
storing a scalable clustered memory storage subsystem baseline design including a scalable number of memory clusters coupled by a hub to support inter-cluster memory traffic between individual memory clusters in the number of memory clusters and traffic with an external interface in memory of the computer-aided design tool;
receiving a scaling command associated with a selection of a maximum supported pixel resolution; and
customizing the scalable clustered memory storage subsystem baseline design by selecting a minimum number of memory clusters required to support memory requirements at the maximum supported pixel resolution to provide a customized integrated circuit design.

10. The method of claim 9, wherein a number of storage devices within an individual memory cluster is scalable within a supported range, the method further comprising selecting a number of storage devices within at least one individual memory cluster in the customized integrated circuit design to be a minimum number of storage devices required to support memory requirements of an individual multi-media integrated circuit.

11. The method of claim 9, wherein a number of individual read ports and individual write ports coupled to each individual memory cluster is selectable within a pre-selected range, the method further comprising selecting the number of read ports and the number of write ports in the customized integrated circuit design to be different numbers to support asymmetric read/write traffic.

12. The method of claim 9, further comprising storing the customized integrated circuit design in a memory.

13. The method of claim 9, further comprising storing in a memory verification data acquired for a hardware implementation of the integrated circuit using the customized integrated circuit design.

14. The method of claim 13, further comprising using the stored verification data to determine a hardware implementation of a memory cluster in the integrated circuit.

15. The method of claim 8, further comprising generating a second customized integrated circuit design, comprising:
receiving a second scaling command associated with a selection of a second maximum supported pixel resolution different than said first maximum supported pixel resolution;
customizing a second version of the scalable clustered memory storage subsystem design to have the minimum number of memory clusters required to support the memory requirements of the second customized integrated circuit design at the second maximum supported pixel resolution;
the second version of the scalable clustered memory storage subsystem design using verification data from the first customized integrated circuit design to determine a hardware implementation of at least one component.

16. The method of claim 15, wherein said at least one component comprises a memory cluster in the hardware implementation of the second version of the scalable clustered memory storage subsystem design.

17. A computer implemented method of designing an integrated circuit to support multi-media processing using a computer-aided design tool, comprising:
storing a scalable clustered memory storage subsystem baseline design including a scalable number of memory clusters coupled by a hub to support inter-cluster memory traffic between individual memory clusters in the number of memory clusters and traffic with an external interface in memory of the computer-aided design tool;
receiving a command indicative of a selection of a minimum number of memory clusters in the clustered memory storage subsystem to support multi-media processing at a maximum supported pixel resolution; and
customizing the scalable clustered memory storage subsystem baseline design based on the selection to minimize integrated circuit real-estate required to support the memory requirements of an individual multi-media integrated circuit to provide a customized integrated circuit design.

18. The method of claim 17, further comprising receiving a selection of a minimum number of storage devices within one individual memory cluster to support multi-media processing at the maximum supported pixel resolution.

19. The method of claim 17, wherein the scalable clustered memory storage subsystem comprises a number of individual read ports and individual write ports coupled to each individual memory cluster is selectable within a pre-selected range, the method further comprising receiving a selection of the number of read ports and the number of write ports to be different numbers to support asymmetric read/write traffic.

20. The method of claim 17, further comprising storing the customized integrated circuit design in a memory.

21. A non-transitory readable storage medium for a computer-aided design tool, comprising executable instructions to:
store a scalable clustered memory storage subsystem baseline design for an integrated circuit having a scalable number of memory clusters coupled by a hub supporting inter-cluster memory traffic between individual memory clusters in the group of memory clusters and traffic with an external interface in memory of the computer-aided design tool;
receive at least one command indicative of a scaling requirement for a required memory capacity of the clustered memory storage subsystem integrated circuit; and
in response to the at least one command, customizing the scalable clustered memory storage subsystem baseline design of the integrated circuit by selecting a minimum number of memory clusters to provide the required memory capacity.

22. The non-transitory readable storage medium of claim 21, wherein in response to the at least one command a minimum number of storage devices is selected in the memory clusters to support the required memory capacity.

23. An integrated circuit having a clustered memory storage subsystem to support multi-media processing, comprising:

a set of memory clusters and a common hub coupled to each memory cluster, the common hub supporting inter-cluster memory traffic between individual memory clusters in the set of memory clusters and traffic with an external interface;

each individual memory cluster having, a number of storage devices; and a number of read ports and write ports to couple the set of memory clusters to a set of processing units;

a memory capacity of the clustered storage subsystem being determined by selecting a number of memory clusters in the set of memory clusters that are fabricated into the integrated circuit and the number of storage devices within each individual memory cluster:

wherein the integrated circuit is customized to support multi-media processing at a selected pixel resolution by selecting the number of memory clusters and the number of storage devices fabricated into the integrated circuit to have a memory capacity sufficient for the selected pixel resolution.

24. The integrated circuit of claim 23, wherein the number of read ports and the number of write ports are different based on asymmetric read/write traffic.

25. The integrated circuit of claim 23, wherein each individual memory cluster comprises an intra-cluster bus coupled to the number of storage devices; and access arbitration logic to control access to the number of storage devices.

* * * * *

UNITED STATES PATENT AND TRADEMARK OFFICE
CERTIFICATE OF CORRECTION

| | | |
|---|---|---|
| PATENT NO. | : 8,122,421 B2 | |
| APPLICATION NO. | : 12/191926 | |
| DATED | : February 21, 2012 | |
| INVENTOR(S) | : Hsueh Ban Lan | |

It is certified that error appears in the above-identified patent and that said Letters Patent is hereby corrected as shown below:

Column 5, Line 32, "requirements," should read --requirements.--;
Column 6, Line 39, "RDdaiaBus1" should read --RDdataBus1--;
   Line 67, "(Back)" should read --(Ack)--;
Column 7, Line 1, "(Back)" should read --(Ack)--; Line 22, "system, design" should
   read --system design--; Line 34, "is use to" should read --is used to--;
Column 8, Line 21, "high, level" should read --high level--;
Column 11, Line 51, "the method of claim 8" should read --The method of claim 9--;
Column 13, Line 10, "having, a" should read --having a--;

Signed and Sealed this
Twenty-ninth Day of May, 2012

David J. Kappos
*Director of the United States Patent and Trademark Office*